(12) United States Patent
Ishihara et al.

(10) Patent No.: US 11,400,999 B2
(45) Date of Patent: Aug. 2, 2022

(54) FRONT FORK AND FRONT FORK MANUFACTURING METHOD

(71) Applicant: KYB MOTORCYCLE SUSPENSION CO., LTD., Gifu (JP)

(72) Inventors: Wataru Ishihara, Gifu (JP); Takahiko Jinnouchi, Gifu (JP)

(73) Assignee: KYB MOTORCYCLE SUSPENSION CO., LTD., Gifu (JP)

( * ) Notice: Subject to any disclaimer, the term of this patent is extended or adjusted under 35 U.S.C. 154(b) by 248 days.

(21) Appl. No.: 16/631,043

(22) PCT Filed: Sep. 5, 2018

(86) PCT No.: PCT/JP2018/032888
§ 371 (c)(1),
(2) Date: Jan. 14, 2020

(87) PCT Pub. No.: WO2019/065131
PCT Pub. Date: Apr. 4, 2019

(65) Prior Publication Data
US 2020/0148301 A1   May 14, 2020

(30) Foreign Application Priority Data
Sep. 27, 2017   (JP) .............................. JP2017-185773

(51) Int. Cl.
*B62K 25/08* (2006.01)
*F16F 9/32* (2006.01)
(52) U.S. Cl.
CPC .......... *B62K 25/08* (2013.01); *B62K 2201/08* (2013.01); *F16F 9/3242* (2013.01); *F16F 9/3271* (2013.01)

(58) Field of Classification Search
CPC ... B62K 25/08; B62K 2201/08; F16F 9/3271; F16F 9/3242
See application file for complete search history.

(56) References Cited

U.S. PATENT DOCUMENTS 8,459,419 B2   6/2013   Jinnouchi
2010/0301578 A1   12/2010   Noda et al.
(Continued)

FOREIGN PATENT DOCUMENTS

CN   102052421 A   5/2011
EP   2644933 A1   10/2013
(Continued)

OTHER PUBLICATIONS

May 31, 2021, European Search Report issued for related EP application No. 18860335.1.
(Continued)

*Primary Examiner* — Kevin Hurley
*Assistant Examiner* — Marlon A Arce
(74) *Attorney, Agent, or Firm* — Paratus Law Group, PLLC (57) ABSTRACT

The front fork of the present invention has a wheel-side bracket that closes another end of an inner tube which is movably inserted inside an outer tube from one end thereof; a cylinder provided inside the inner tube; and a head member that is fitted to the cylinder side on the opposite side from the wheel-side bracket, in which the cylinder and the head member are sandwiched, while subjected to an axial force, by a fastening portion formed on the inner tube and the wheel-side bracket.

6 Claims, 4 Drawing Sheets

(56) References Cited

U.S. PATENT DOCUMENTS

| | | | | |
|---|---|---|---|---|
| 2011/0095462 A1* | 4/2011 | Jinnouchi | ............. | F16F 9/3242 |
| | | | | 267/226 |
| 2013/0049274 A1* | 2/2013 | Sugawara | ............. | F16F 13/007 |
| | | | | 267/217 |
| 2021/0122440 A1* | 4/2021 | Noguchi | ................ | F16F 9/185 |

FOREIGN PATENT DOCUMENTS

| | | | |
|---|---|---|---|
| GB | 2544245 | A | 5/2017 |
| JP | 2009-222221 | A | 10/2009 |
| JP | 2011-094647 | A | 5/2011 |
| JP | 2016-065608 | A | 4/2016 |

OTHER PUBLICATIONS

Jul. 1, 2021, Chinese Office Action issued for related CN application No. 201880046161.0.
Jan. 4, 2021, Chinese Office Action issued for related CN application No. 201880046161.0.
Sep. 14, 2021, Japanese Office Action issued for related JP application No. 2017-185773.
Dec. 14, 2021, Japanese Office Action issued for related JP Application No. 2017-185773.

* cited by examiner

FRONT FORK AND FRONT FORK MANUFACTURING METHOD

CROSS REFERENCE TO PRIOR APPLICATION

This application is a National Stage Patent Application of PCT International Patent Application No. PCT/JP2018/032888 (filed on Sep. 5, 2018) under 35 U.S.C. § 371, which claims priority to Japanese Patent Application No. 2017-185773 (filed on Sep. 27, 2017), which are all hereby incorporated by reference in their entirety.

TECHNICAL FIELD

The present invention relates to improving a front fork and a front fork manufacturing method.

BACKGROUND ART

Conventionally, front forks include a front fork in which a damper is provided inside an inner tube that has been movably inserted inside an outer tube, a cylinder of the damper is coupled to the inner tube, and a rod of the damper is coupled to the outer tube.

Furthermore, in this kind of front fork, as disclosed in JP2011-094647A, for example, a head member, which is fitted to an end portion on the outer tube side of the cylinder, may be configured having an annular stopper portion, which is attached via pins to an inner periphery of the inner tube, and a cylinder head portion, which is fitted to the end portion on the outer tube side of the cylinder and threaded with an inner periphery of the stopper portion.

According to this configuration, when the cylinder head portion is screwed onto the stopper portion attached to the inner tube, the cylinder is then pressed against a lid portion that closes the opening in the inner tube on the opposite side from the outer tube, and a force (axial force) acts on the cylinder in an axial direction. Thus, the cylinder is fixed without rattling inside the inner tube.

That is, according to the foregoing configuration, there is no need to perform screw machining on the cylinder in fixing the cylinder inside the inner tube, and the tensile force acting on the damper can be borne by the inner tube. Therefore, the cylinder wall can be made thin and light-weight. In addition, based on the premise that the lid portion is fixed to the inner tube, a threading part for fixing the cylinder serves as one part of a threading part for the stopper portion and cylinder head portion, thereby minimizing screw machining and threading work, and enabling costs to be reduced.

SUMMARY OF INVENTION

In the foregoing conventional front fork, a plurality of pins are used to mount the stopper portion on the inner periphery of the inner tube, and holes in the same quantity as the pins are formed side-by-side in a circumferential direction in the inner tube and stopper portion, respectively.

The pins are inserted through the holes in the inner tube via the holes in the stopper portion from the inner peripheral side of the stopper portion, and are biased toward the inner tube by means of snap rings. The stopper portion is thus held by the inner periphery of the inner tube. Furthermore, as a result of the cylinder head portion being threaded with the inner periphery of the stopper portion thus held, the cylinder is sandwiched, while subjected to an axial force, between the head member and the lid portion.

That is, there are a large number of components in a conventional front fork because a stopper portion, a cylinder head portion, pins, and snap rings are required to fix the cylinder to the inside of the inner tube. In addition, the stopper portion and cylinder head portion are threaded together, and hence screw machining and threading work are required for these parts. There is therefore room for additional cost reduction.

Therefore, an object of the present invention is to solve such problems and provide a front fork and a front fork manufacturing method which make cost reduction possible by reducing the number of components, screw machining, and threading work for fixing a cylinder inside an inner tube.

The front fork of the present invention comprises a lid portion that closes another end of an inner tube which is movably inserted inside an outer tube from one end thereof; a cylinder provided inside the inner tube; and a head member that is fitted to the cylinder side on the opposite side from the lid portion, wherein the cylinder and the head member are sandwiched, while subjected to an axial force, by a fastening portion formed on the inner tube, and the lid portion.

Furthermore, a first manufacturing method of the front fork of the present invention comprises inserting a cylinder and a head member inside an inner tube on which a lid portion has been mounted, and forming a fastening portion by performing fastening machining on the inner tube with an axial force applied to the cylinder and the head member.

Furthermore, a second manufacturing method of the front fork of the present invention comprises inserting a cylinder and a head member inside an inner tube, and applying an axial force to the cylinder and head member by threading a lid portion onto the inner tube with the head member supported by a fastening portion formed by performing fastening machining on the inner tube.

DESCRIPTION OF EMBODIMENTS

A front fork according to an embodiment of the present invention will be described hereinbelow with reference to the drawings. Identical reference signs which have been assigned throughout several drawings denote identical or corresponding components.

Figure 1:
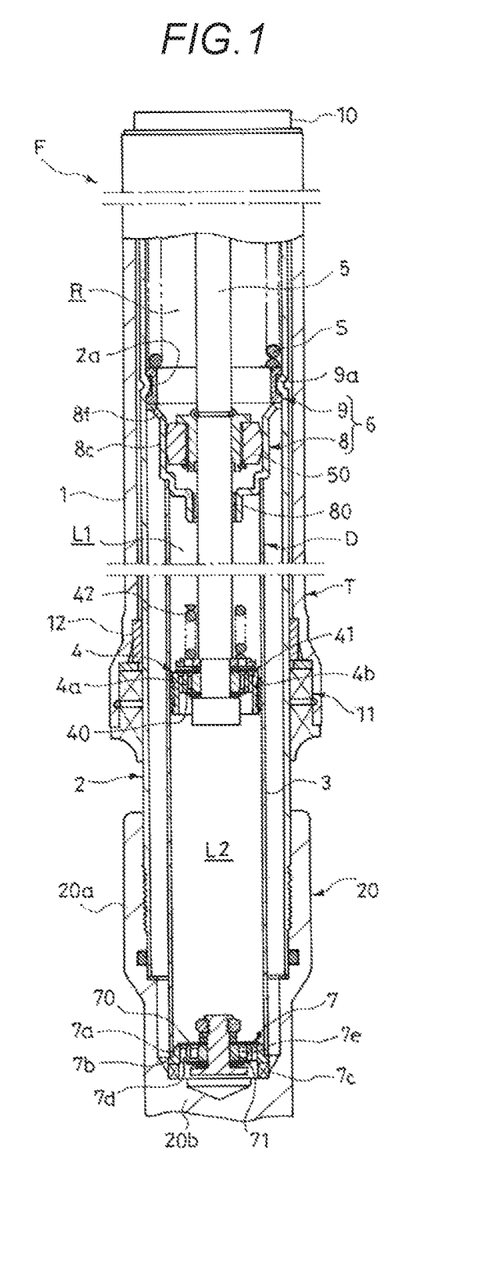
FIG. 1 is a front elevation illustrating a partial cutaway of a front fork according to an embodiment of the present invention.

A front fork F according to an embodiment of the present invention, which is illustrated in FIG. 1, is a suspension device that suspends a front wheel of a saddled vehicle. In the description hereinbelow, unless otherwise described, upper and lower sections via which the front fork F is attached to the vehicle are referred to as the "upper" and "lower" sections of the front fork F.

The front fork F comprises a telescopic tube member T, which is configured having an outer tube 1, and an inner tube 2 slidably inserted inside the outer tube 1; a damper D and a suspension spring S which are housed inside the tube member T.

The tube member T is self-balancing, wherein the outer tube 1 is disposed toward an upper side (vehicle body side), and the inner tube 2 is disposed toward a lower side (wheel side). That is, in the present embodiment, the outer tube 1 serves as a vehicle body-side tube, and the inner tube serves as a wheel-side tube.

The outer tube 1 is coupled to the body of the vehicle via a vehicle body-side bracket (not illustrated). Meanwhile, the inner tube 2 is coupled to the axle of the front wheel via a wheel-side bracket 20. The front fork F is thus interposed between the vehicle body and the vehicle axle. Furthermore, when the front wheel vibrates up and down while the vehicle is traveling on an uneven road surface, and so forth, the inner tube 2 leaves and enters the outer tube 1, thereby causing the front fork F to contract and extend.

Note that the tube member T is upright and the outer tube 1 may be used as the wheel-side tube, while the inner tube 2 may be used as the vehicle body-side tube. Moreover, saddled vehicles whereon the front fork F may be mounted are all vehicles of the type where a rider rides in a posture straddling a saddle, including motorcycles (including scooters) and three-wheelers, and the like. Furthermore, the front fork F according to the present invention may be used for any saddled vehicle.

Furthermore, the upper end of the outer tube 1 is closed by a cap 10, and the cap 10 serves as a lid portion that closes the upper end of the outer tube 1. Further, the lower end of the inner tube 2 is closed by a wheel-side bracket 20, and the wheel-side bracket 20 serves as a lid portion that closes the lower end of the inner tube 2. In addition, the space between the outer tube 1 and the inner tube 2 is closed by means of a seal member 11.

The inside of the tube member T is thus used as an airtight space, and the damper D is housed inside the tube member T. Furthermore, a fluid storage chamber R is formed between the tube member T and the damper D, a fluid such as hydraulic oil is stored in the fluid storage chamber R, and a gas is enclosed by the upper side of the fluid surface. Further, the suspension spring S is housed in the fluid storage chamber R.

The damper D comprises a cylinder 3 that houses a fluid; a piston 4 that is slidably inserted inside the cylinder 3; a rod 5, one end of which is coupled to the piston 4 and the other end of which protrudes outside the cylinder 3; an annular head member 6 that is fitted to one end of the cylinder 3 and permits insertion of the rod 5 therethrough; and a bottom member 7 that is fitted to the other end of the cylinder 3.

In addition, the damper D is upright and the rod 5, which protrudes outside the cylinder 3, is disposed toward the upper side (vehicle body side) of the cylinder 3. Further, the rod 5 is coupled to the outer tube 1 via the cap 10, and the cylinder 3 is coupled to the inner tube 2.

The damper D is thus interposed between the outer tube 1 and the inner tube 2. Furthermore, when the front fork F extends and contracts, the rod 5 leaves and enters the cylinder 3 such that the damper D extends and contracts, thereby causing the piston 4 to move up and down inside the cylinder 3. Note that a structure in which the cylinder 3 is coupled to the inner tube 2 will be described in detail subsequently.

The openings at the top and bottom of the cylinder 3 are closed by the head member 6 and bottom member 7, respectively. Furthermore, a fluid chamber filled with a fluid is formed inside the cylinder 3, and this fluid chamber is divided by the piston 4 into an extension-side chamber L1 on an upper side (rod 5 side) and a compression-side chamber L2 on a lower side (piston 4 side).

An extension-side passage 4a and a compression-side passage 4b that interconnect the extension-side chamber L1 and compression-side chamber L2 are formed in the piston 4. Furthermore, an extension-side valve 40 that opens and closes an outlet of the extension-side passage 4a is laminated on the lower side of the piston 4. The extension-side valve 40 is a damping valve that affords resistance to the flow of fluid moving through the extension-side passage 4a from the extension-side chamber L1 to the compression-side chamber L2, and blocks flow in the opposite direction. Meanwhile, a compression-side valve 41 that opens and closes an outlet of the compression-side passage 4b is laminated on the upper side of the piston 4. The compression-side valve 41 is a check valve that permits the flow of fluid moving through the compression-side passage 4b from the compression-side chamber L2 to the extension-side chamber L1, and blocks flow in the opposite direction.

Furthermore, the bottom member 7 has a fitting portion 7a that is fitted to the lower end of the cylinder 3, and a flange portion 7b that juts out in a lateral direction from the lower end portion of the fitting portion 7a. This flange portion 7b protrudes to the lower side of the cylinder 3 and is sandwiched between the cylinder 3 and the wheel-side bracket 20. In addition, a notch 7c that guides the fluid in the fluid storage chamber R to the lower side of the fitting portion 7a is formed in the flange portion 7b, and a suction passage 7d and a discharge passage 7e that interconnect the compression-side chamber L2 and the fluid storage chamber R via the notch 7c are formed in the fitting portion 7a.

In addition, a suction valve 70 that opens and closes an outlet of the suction passage 7d is laminated on the upper side of the fitting portion 7a. The suction valve 70 is a check valve that permits the flow of fluid moving through the suction passage 7d from the fluid storage chamber R to the compression-side chamber L2, and blocks flow in the opposite direction. Meanwhile, a discharge valve 71 that opens and closes an outlet of the discharge passage 7e is laminated on the lower side of the fitting portion 7a. The discharge valve 71 is a damping valve that affords resistance to the flow of fluid moving through the discharge passage 7e from the compression-side chamber L2 to the fluid storage chamber R, and blocks flow in the opposite direction.

According to the foregoing configuration, when the front fork F extends, the rod 5 leaves the cylinder 3, and the piston 4 moves upward inside the cylinder 3 such that the extension-side chamber L1 is reduced, the fluid in the extension-side chamber L1 pushes open the extension-side valve 40 and moves toward the compression-side chamber L2 via the extension-side passage 4a. Because resistance to the flow of the fluid is afforded by means of the extension-side valve 40, the pressure in the extension-side chamber L1 rises, and the damper D exhibits a damping force on the extension-side that impedes an extension operation. In addition, at the time of extension, the suction valve 70 opens and fluid corresponding to the volume of the rod that has left the cylinder 3 is supplied via the suction passage 7d from the fluid storage chamber R to the compression-side chamber L2.

Conversely, when the front fork F contracts, the rod 5 enters the cylinder 3, and the piston 4 moves downward inside the cylinder 3 such that the compression-side chamber L2 is reduced, the fluid in the compression-side chamber L2 then opens the compression-side valve 41 and moves toward the extension-side chamber L1 via the compression-side passage 4b. In addition, at the time of contraction, the fluid in the compression-side chamber L2 pushes open the discharge valve 71, and fluid corresponding to the volume of the rod that has entered the cylinder 3 is discharged via the discharge passage 7e to the fluid storage chamber R. Because resistance to the flow of the fluid is afforded by means of the discharge valve 71, the pressure in the cylinder 3 rises, and the damper D exhibits a damping force on the compression-side that impedes a contraction operation.

Note that the configuration of the damper D is not limited to the foregoing and may be changed as appropriate. For example, the configurations of the passages that interlink each of the chambers such as the extension-side chamber L1, the compression-side chamber L2, and the fluid storage chamber R, as well as the configurations of the valves provided in each of the passages may be changed as appropriate. In addition, an orifice or choke, or the like, may be used to afford resistance to the flow of fluid.

In addition, if the tube member T is of the upright type, the damper D is self-balancing and the rod 5 may be made to protrude downward from the cylinder 3. Furthermore, in the present embodiment, the damper D is of the single rod-type, and the fluid storage chamber R functions as a reservoir for compensating for the volume of the rod 5 that leaves and enters the cylinder 3.

However, an air chamber capable of expansion/contraction may be formed in the cylinder 3 by using a free piston or a bladder, or the like, and the air chamber may be used to compensate for the volume of the rod 5 that leaves and enters the cylinder 3. In addition, the damper D may be of the dual rod-type, and the rod may protrude outside the cylinder 3 from both ends of the piston 4, in which case there is no need to compensate for the volume of the rod that leaves and enters the cylinder 3.

In addition, in the present embodiment, the cylinder 3, the rod 5, and the head member 6 are members that constitute the damper D, which is a fluid pressure damper that generates a damping force by affording resistance to the flow of fluid, but the cylinder 3, the rod 5, and the head member 6 need not be used other than for a fluid pressure damper. In this case, for example, the piston 4 and bottom member 7 in which the passages are formed and the valves that open and close the passages, and the like, may be discarded, and a spring device may be configured by the cylinder 3, rod 5, head member 6, and a suspension spring such that the suspension spring, which is housed inside the cylinder 3, is compressed by the rod 5.

Figure 2:
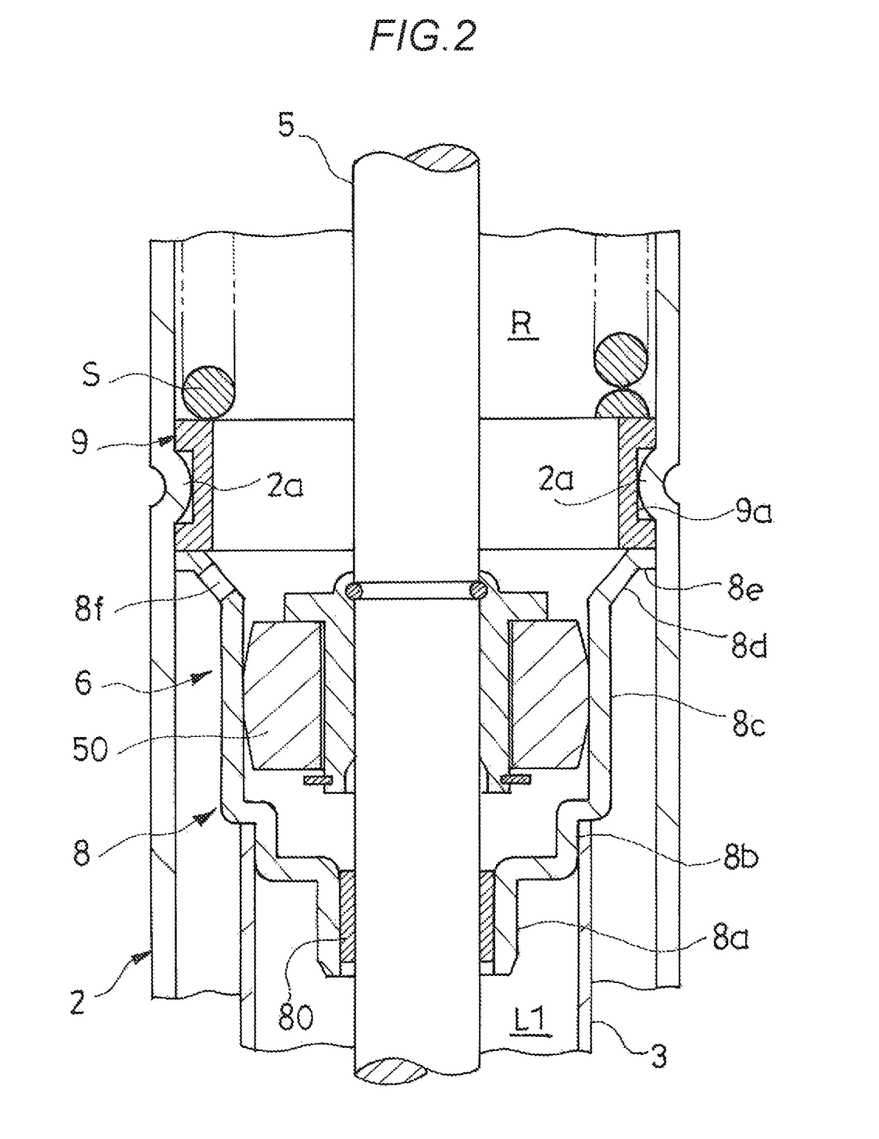
FIG. 2 is a partial enlarged vertical cross-sectional view of an enlarged section of FIG. 1.

Furthermore, the head member 6 is configured having a cylinder head portion 8, which is fitted to the upper end of the cylinder 3, and an annular stopper portion 9, which is laminated on the upper side of the cylinder head portion 8.

An annular groove 9a is formed along the circumferential direction of an outer periphery of the stopper portion 9. Furthermore, with the stopper portion 9 inserted in the inner tube 2, a part of the inner tube 2 opposite the annular groove 9a is fastened so as to protrude toward the inner peripheral side, thereby fitting the part (called a fastening portion 2a hereinbelow) inside the annular groove 9a. The stopper portion 9 is thus held by the inner tube 2.

In addition, the suspension spring S is laminated on the upper side of the stopper portion 9. The suspension spring S is a coiled spring, the upper end of which is supported by the cap 10 (FIG. 1). Because the cap 10 is coupled to the outer tube 1, the upper end of the suspension spring S may be considered to be supported by the outer tube 1 via the cap 10. Meanwhile, the lower end of the suspension spring S is supported by the inner tube 2 via the stopper portion 9.

The suspension spring S is thus interposed between the outer tube 1 and the inner tube 2. Furthermore, when the front fork F contracts and the inner tube 2 enters the outer tube 1, the suspension spring S is compressed and elastically deformed, thereby exerting an elastic force commensurate with the amount of deformation and biasing the front fork F in the direction of extension. The suspension spring S thus elastically supports the vehicle body via the front fork F.

Note that the configuration and disposition of the suspension spring S may be changed as appropriate. For example, the suspension spring S may be a spring other than a coiled spring such as an air spring. Thus, when the suspension spring S is an air spring, a gas is enclosed while being compressed by the upper side of the fluid surface of the fluid storage chamber R, and an air chamber in which the gas is enclosed may be used by the air spring. In addition, the suspension spring S may be housed in the cylinder 3 and compressed by means of the rod 5.

Furthermore, as illustrated in FIG. 2, the cylinder head portion 8 is annular when viewed in an axial direction and includes an annular guide portion 8a, to the inner periphery of which a bush 80 is fitted; an annular fitting portion 8b that extends from an upper side of the guide portion 8a and has a larger outside diameter than the outside diameter of the guide portion 8a; a cylindrical case portion 8c that extends from an upper side of the fitting portion 8b and has a larger outside diameter than the outside diameter of the fitting portion 8b; a truncated cone-shaped tapered portion 8d that extends from an upper end of the case portion 8c and has an outside diameter that gradually expands in moving toward an upper end of the tapered portion 8d; and a ring-plate shaped support portion 8e that extends from the upper end of the tapered portion 8d and supports the stopper portion 9.

Furthermore, the fitting portion 8b is fitted to the inner periphery of the upper end portion of the cylinder 3, and the bush 80 is annular and makes sliding contact with the outer periphery of the rod 5. That is, the cylinder head portion 8 axially supports the rod 5 slidably via the bush 80, and functions as a rod guide.

In addition, a through hole 8f is formed in the tapered portion 8d, the inside diameter of the stopper portion 9 is configured larger than the outside diameter of the rod 5, and consideration is given to ensure that the fluid storage chamber R is not partitioned by the head member 6. Hence, when fluid moves in and out of the cylinder 3 as the front fork F extends and contracts, a corresponding amount of fluid is able to travel between the upper side of the head member 6 and the outer peripheral side of the cylinder 3 via the through hole 8f and the inner peripheral side of the stopper portion 9.

Furthermore, in the present embodiment, as illustrated in FIG. 1, an extension limit spring 42 is provided between the cylinder head portion 8 and the piston 4, and shocks when the front fork F is fully extended are mitigated by the extension limit spring 42.

In addition, the case portion 8c of the cylinder head portion 8 is provided immersed in the fluid of the fluid storage chamber R. Furthermore, a lock piece 50 is provided on the outer periphery of the rod 5 protruding outside the cylinder 3, and the fluid inside the case portion 8c is contained by the lock piece 50 when the front fork F is fully contracted, whereby the contraction operation of the front fork F is stopped by the fluid pressure. When this kind of fluid pressure lock mechanism is used, it is possible to mitigate shocks when the front fork F is fully contracted.

Note that the configuration of the fluid pressure lock mechanism may be changed as appropriate. Moreover, the configuration for mitigating shocks when the front fork F is fully extended or fully contracted may also be changed as appropriate. For example, in order to mitigate shocks when the front fork F is fully extended, cushion gum or a fluid pressure lock mechanism, or the like, may be used instead of the foregoing extension limit spring 42. In addition, in order to mitigate shocks when the front fork F is fully contracted, a spring or cushion gum, or the like, may be used instead of the foregoing fluid pressure lock mechanism.

Next, a method for manufacturing the front fork F according to the present embodiment will be described.

First, the damper D is inserted inside the inner tube 2 whereon the wheel-side bracket 20 is mounted. At such time, the cylinder head portion 8 and bottom member 7 are lightly press-fitted to the two ends of the cylinder 3 respectively, and the rod 5, at the tip of which the piston 4 is mounted, is inserted inside the cylinder 3. In addition, with the damper D inserted inside the inner tube 2, the stopper portion 9 assumes a state of being laminated on the support portion 8e of the cylinder head portion 8.

Note that, in the damper insertion step, the damper D excluding the stopper portion 9 may be inserted inside the inner tube 2 and then the stopper portion 9 may be inserted inside the inner tube 2, or the damper D may be inserted inside the inner tube 2 with the stopper portion 9 laminated on the cylinder head portion 8.

Thereafter, while pressing the stopper portion 9, the cylinder head portion 8, the cylinder 3, and the bottom member 7 onto the wheel-side bracket 20 by applying a force in an axial direction to the stopper portion 9, the part of the inner tube 2 that corresponds to the annular groove 9a is fastened to fit the fastening portion 2a to the annular groove 9a. In so doing, the stopper portion 9, the cylinder head portion 8, the cylinder 3, and the bottom member 7 are sandwiched, while subjected to an axial force, between the fastening portion 2a and the wheel-side bracket 20. Thus, the stopper portion 9, the cylinder head portion 8, the cylinder 3, and the bottom member 7 are fixed without rattling inside the inner tube 2.

Thereafter, the outer tube 1 is mounted on the outer periphery of the inner tube 2 from the side opposite that of the wheel-side bracket 20 (on the opposite side from the wheel-side bracket). A seal member 11 and a bush 12 are mounted on the outer tube 1. The suspension spring S is then inserted inside the inner tube 2 and a fluid is poured inside, and after coupling the cap 10 to the rod 5, the cap 10 is coupled to the outer tube 1.

Note that, when it is difficult to mount the outer tube 1 on the outer periphery of the inner tube 2 from the opposite side from the wheel-side bracket, the outer tube 1 may also be mounted to the outer periphery of the inner tube 2 before inserting the damper D inside the inner tube 2. Furthermore, if fastening machining can be performed with an axial force applied to the cylinder 3 and the like, the cap 10 may be mounted on the rod 5 even though the suspension spring S has been inserted inside the inner tube 2 during the fastening machining.

The action and effect of the front fork F according to the present embodiment is described hereinbelow.

According to the present embodiment, the front fork F comprises the outer tube 1, the inner tube 2 that is movably inserted inside the outer tube 1 from an upper end (one end) thereof, the wheel-side bracket (lid portion) 20 that closes a lower end (other end) of the inner tube 2, the cylinder 3 provided inside the inner tube 2, the rod 5 that is coupled to the outer tube 1 and movably inserted inside the cylinder 3, and the head member 6 that is fitted to an upper end of the cylinder 3 (on the opposite side from the wheel-side bracket (lid portion)) and permits insertion of the rod 5 therethrough.

Furthermore, in the front fork F according to the present embodiment, the cylinder 3 and the head member 6 are sandwiched, while subjected to an axial force, by the fastening portion 2a formed on the inner tube 2, and the wheel-side bracket (lid portion) 20.

Thus, according to the present embodiment, the cylinder 3 and the head member 6 are fixed by being sandwiched between the wheel-side bracket 20 and the fastening portion 2a. Hence, pins and snap rings, which are used in conventional front forks when fixing the cylinder 3 inside the inner tube 2, are no longer needed. Thus, according to the foregoing configuration, the number of components in the front fork F can be made smaller than in conventional usage.

Furthermore, according to the foregoing configuration, there is no need to perform screw machining of the cylinder 3 in fixing the cylinder 3 inside the inner tube 2, and the tensile force acting on the damper D can be borne by the inner tube 2. Therefore, the wall of the cylinder 3 can be made thin and lightweight. In addition, based on the premise that the wheel-side bracket (lid portion) 20 is fixed to the inner tube 2, the threading part for fixing the cylinder 3 inside the inner tube 2 is no longer required. Hence, the screw machining and threading work can be minimized during manufacturing of the front fork F.

Furthermore, although a fastening portion 2a is formed on the inner tube 2 according to the present embodiment, the fastening portion 2a is a part that is plastically deformed by means of fastening machining, and forming this fastening portion 2a is straightforward in comparison with cases where screw machining and threading work are carried out. Moreover, according to the foregoing configuration, the conventional labor involved in pin insertion is also spared. Accordingly, according to the foregoing configuration, cost reduction is made possible by reducing the number of components, screw machining, and threading work for fixing the cylinder 3 inside the inner tube 2.

Furthermore, in the present embodiment, the head member 6 has a cylinder head portion 8 that is fitted to the cylinder 3, and an annular stopper portion 9 that is laminated on the cylinder head portion 8 and to which the fastening portion 2a is fitted. According to the foregoing configuration, the stopper portion 9 is capable of functioning as a cover plate when forming the fastening portion 2a by means of fastening machining.

In addition, as per the front fork F according to the present embodiment, when the head member 6 and the cylinder 3 are sandwiched, with an axial force applied, between the fastening portion 2a and wheel-side bracket (lid portion) 20, improving the machining accuracy of the part of the stopper portion 9 into which the fastening portion 2a is fitted enables variance in the axial force applied to the cylinder 3 and the like to be suppressed.

Therefore, when the part into which the fastening portion 2a is fitted, that is, the part in which the annular groove 9a according to the present embodiment is formed is used as the stopper portion 9 and is formed separately from the cylinder head portion 8, machining methods which are suited to the required machining accuracy are easily selected for the stopper portion 9 and cylinder head portion 8, respectively. For example, the annular groove 9a, which requires highly accurate machining accuracy, may be formed by means of cutting or the like, and press working or the like may be adopted for the cylinder head portion 8.

Furthermore, in the present embodiment, the fastening portion 2a is fitted to the annular groove 9a formed along the circumferential direction of the outer periphery of the stopper portion 9. Hence, the fastening portion 2a can be fitted to the stopper portion 9 even when the stopper portion 9 is not aligned in a circumferential direction with the inner tube 2. Thus, fitting the fastening portion 2a, which is formed on the inner tube 2, to the stopper portion 9 is straightforward.

In addition, in order to apply an axial force as evenly as possible in a circumferential direction to the cylinder 3 and the like, the fastening portion 2a may be formed in three or four locations at equal intervals in the circumferential direction of the inner tube 2. However, the number of fastening portions 2a may be changed as appropriate. Furthermore, the shape of the groove part into which the fastening portion 2a is fitted need not be annular, rather, a plurality of groove parts may be formed side-by-side in the circumferential direction of the stopper portion 9.

In addition, the fastening portion 2a need not necessarily be fitted to the stopper portion 9. For example, a structure in which the fastening portion 2a is made to abut against the stopper portion 9 and the stopper portion 9 is pressed by the fastening portion 2a is also possible. More specifically, as per a head member 6A according to a first modification example illustrated in FIG. 3, the stopper portion 9 of the head member 6 may be replaced with a ring-plate shaped stopper portion 9A, and the upper side of this stopper portion 9A may be pressed by the fastening portion 2a. In this case, a washer or the like can be used as the stopper portion 9A.

In addition, the stopper portion 9 and cylinder head portion 8 may be integrally formed. More specifically, for example, as per a head member 6B according to a second modification example illustrated in FIG. 4, the support portion 8e of the cylinder head portion 8 of the head member 6 may be used as a stopper portion 9B, and the upper side of the stopper portion 9B may be pressed by the fastening portion 2a. Note that, as per the head member 6B, even if the stopper portion 9B and cylinder head portion 8 are integrally formed, a groove such as an annular groove may be formed in the outer periphery of the stopper portion 9B, and the fastening portion 2a may be fitted inside the groove.

Figure 3:
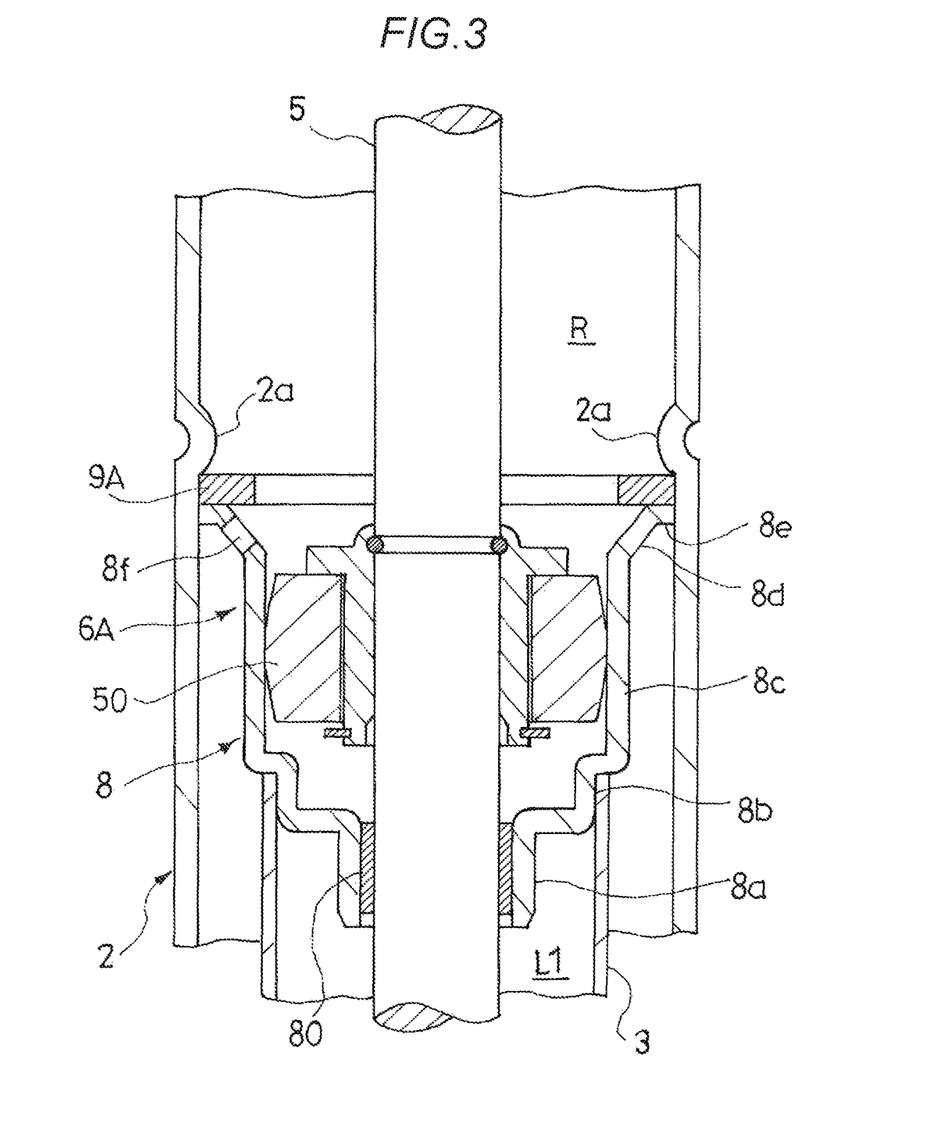
FIG. 3 is a partial enlarged vertical cross-sectional view of an enlarged head member part, illustrating a first modification example of a head member of the front fork according to an embodiment of the present invention.
Figure 4:
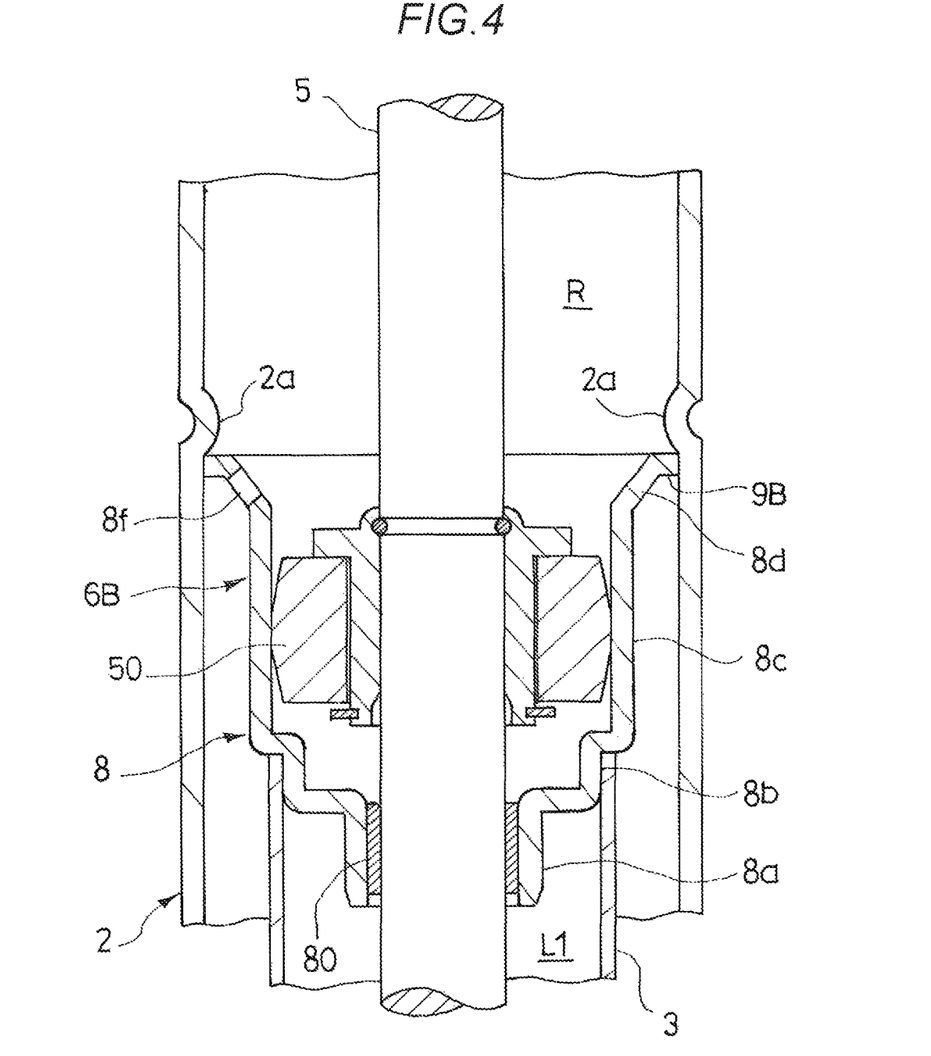
FIG. 4 is a partial enlarged vertical cross-sectional view of an enlarged head member part, illustrating a second modification example of a head member of the front fork according to an embodiment of the present invention.

Although the suspension spring S has been omitted from FIGS. 3 and 4, it goes without saying that the lower end of the suspension spring S may be made to abut against the head member 6A, 6B. Furthermore, the configuration of the cylinder head portion 8 may be changed as appropriate. For example, when the fluid pressure lock mechanism is not used to mitigate shocks when the front fork F is fully contracted, the case portion 8c may be omitted.

In addition, in the front fork F according to the present embodiment, the cylinder 3 and the head member 6 are inserted inside the inner tube 2 with the wheel-side bracket (lid portion) 20 mounted, and the fastening portion 2a is formed by performing fastening machining on the inner tube 2 with an axial force applied to the cylinder 3 and the head member 6. According to the manufacturing method, the cylinder 3 and the head member 6 can be sandwiched, while subjected to an axial force, between the fastening portion 2a and the wheel-side bracket 20.

In addition, in the present embodiment, the wheel-side bracket (lid portion) 20, which closes the lower end (other end) of the inner tube 2, is threaded with the inner tube 2. Therefore, the cylinder 3 and the head member 6 may be inserted inside the inner tube 2, and with the head member 6 supported by the fastening portion 2a formed by performing fastening machining on the inner tube 2, an axial force may be applied to the cylinder 3 and the head member 6 by threading the wheel-side bracket 20 onto the inner tube 2. Also according to the manufacturing method, the cylinder 3 and the head member 6 can be sandwiched, while subjected to an axial force, between the fastening portion 2a and the wheel-side bracket 20.

Naturally, each of the foregoing manufacturing methods may be selected irrespective of the configuration of the head member 6 and may be adopted irrespective of which of the head members 6, 6A, or 6B is used. Moreover, the manufacturing method of the front fork F is not limited to the foregoing methods and may be changed as appropriate.

Furthermore, in the present embodiment, the lid portion that closes the lower end (other end) of the inner tube 2 is the wheel-side bracket 20, and the wheel-side bracket 20 is formed having a closed-ended, tubular shape. Further, the inner tube 2 is threaded with the inner periphery of a tubular portion 20a of the wheel-side bracket 20, and a bottom portion 20b of the wheel-side bracket 20 functions as the lid portion.

However, a lid portion that is threaded with the inner periphery of the inner tube 2 could also be provided separately from the wheel-side bracket 20, and when the tube member T is upright, a cap that closes the upper end of the inner tube 2 may function as the lid portion. Moreover, such modifications are possible irrespective of the configuration of the head member 6 and the manufacturing method of the front fork F.

Although the preferred embodiments of the present invention have been described above in detail, modifications, variations and changes are possible without departing from the scope of the claims.

The invention claimed is:

1. A front fork, comprising:
an outer tube;
an inner tube that is movably inserted inside the outer tube from one end thereof;
a lid portion that closes another end of the inner tube;
a cylinder provided inside the inner tube;
a rod that is coupled to the outer tube and movably inserted inside the cylinder; and
a head member that is fitted to the cylinder side on the opposite side from the lid portion and permits insertion of the rod therethrough,
wherein the cylinder and the head member are sandwiched, while subjected to an axial force, by a fastening portion formed by plastically deforming on the inner tube by means of fastening machining, and the lid portion.

2. The front fork as claimed in claim 1,
wherein the head member has a cylinder head portion that is fitted to the cylinder, and an annular stopper portion that is laminated on the cylinder head portion and to which the fastening portion is fitted.

3. The front fork as claimed in claim 2,
wherein an annular groove into which the fastening portion is fitted is formed along a circumferential direction in the outer periphery of the stopper portion.

4. The front fork as claimed in claim 1,
wherein the lid portion is threaded with the inner tube.

5. A front fork manufacturing method,
the front fork having
an outer tube,
an inner tube that is movably inserted inside the outer tube from one end thereof,
a lid portion that closes another end of the inner tube,
a cylinder provided inside the inner tube,
a rod that is coupled to the outer tube and movably inserted inside the cylinder, and a head member that is fitted to the cylinder side on the opposite side from the lid portion and permits insertion of the rod therethrough, the manufacturing method comprising:

inserting the cylinder and the head member inside the inner tube on which the lid portion has been mounted and forming a fastening portion by plastically deforming on the inner tube by performing fastening machining with an axial force applied to the cylinder and the head member; and sandwiching the cylinder and the head member by means of the fastening portion and the lid portion.

6. A front fork manufacturing method, the front fork having an outer tube, an inner tube that is movably inserted inside the outer tube from one end thereof, a lid portion that closes another end of the inner tube, a cylinder provided inside the inner tube, a rod that is coupled to the outer tube and movably inserted inside the cylinder, and a head member that is fitted to the cylinder side on the opposite side from the lid portion and permits insertion of the rod therethrough, the manufacturing method comprising:

inserting the cylinder and the head member inside the inner tube, and applying an axial force to the cylinder and the head member by threading the lid portion onto the inner tube with the head member supported by a fastening portion formed by plastically deforming on the inner tube by performing fastening machining.

* * * * *